(12) United States Patent
Sakaguchi

(10) Patent No.: US 11,697,455 B2
(45) Date of Patent: Jul. 11, 2023

(54) TURNING SYSTEM

(71) Applicant: TOYOTA JIDOSHA KABUSHIKI KAISHA, Toyota (JP)

(72) Inventor: Ruriko Sakaguchi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 950 days.

(21) Appl. No.: 16/592,889

(22) Filed: Oct. 4, 2019

(65) Prior Publication Data

US 2020/0172160 A1 Jun. 4, 2020

(30) Foreign Application Priority Data

Dec. 4, 2018 (JP) ................................. 2018-227291

(51) Int. Cl.
| | |
|---|---|
| B62D 6/00 | (2006.01) |
| B62D 3/12 | (2006.01) |
| B62D 5/06 | (2006.01) |
| B62D 5/083 | (2006.01) |
| B62D 1/04 | (2006.01) |
| B62D 5/12 | (2006.01) |
| B62D 5/04 | (2006.01) |
| B62D 5/09 | (2006.01) |

(52) U.S. Cl.
CPC ............... *B62D 6/005* (2013.01); *B62D 1/04* (2013.01); *B62D 3/126* (2013.01); *B62D 5/046* (2013.01); *B62D 5/0424* (2013.01); *B62D 5/063* (2013.01); *B62D 5/083* (2013.01); *B62D 5/091* (2013.01); *B62D 5/12* (2013.01)

(58) Field of Classification Search
None
See application file for complete search history.

(56) References Cited

U.S. PATENT DOCUMENTS 6,612,393 B2 * 9/2003 Bohner .................... B62D 5/06
180/407
9,469,340 B2 * 10/2016 Morselli ................ B62D 6/007
(Continued)

FOREIGN PATENT DOCUMENTS

| JP | 2003-237610 A | 8/2003 |
|---|---|---|
| JP | 2007-125973 A | 5/2007 |

(Continued)

*Primary Examiner* — Kevin Hurley
*Assistant Examiner* — Harold Eric Pahlck, III
(74) *Attorney, Agent, or Firm* — Sughrue Mion, PLLC

(57) ABSTRACT

A turning system is configured to move a turning shaft to turn a left wheel and a right wheel of a vehicle. The turning shaft is configured to couple the left wheel and the right wheel to each other. A torsion bar is engaged with the turning shaft via a steering gear box. The turning system includes: a turning mechanism including (i) an electric turning mechanism including an electric motor configured to rotate a portion of the torsion bar which is located upstream of the steering gear box and (ii) a hydraulic turning mechanism configured to apply a moving force to the turning shaft in an axial direction, the moving force being produced by a hydraulic pressure; and an electric-motor controller configured to control the electric motor based on a frictional force in the turning mechanism and a road-surface reaction force that acts between (a) a tire on the left wheel and a tire on the right wheel and (b) a road surface.

5 Claims, 8 Drawing Sheets

(56) References Cited

U.S. PATENT DOCUMENTS

| | | | |
|---|---|---|---|
| 9,751,557 B2* | 9/2017 | Svensson | B62D 6/008 |
| 2008/0189014 A1 | 8/2008 | Tanaka et al. | |
| 2010/0147618 A1* | 6/2010 | Osonoi | B62D 5/003 |
| | | | 180/432 |
| 2014/0074355 A1 | 3/2014 | Kim et al. | |
| 2014/0365076 A1 | 12/2014 | Cash | |
| 2018/0111643 A1* | 4/2018 | Kim | B62D 5/091 |
| 2019/0092376 A1* | 3/2019 | Panse | B60R 25/02 |
| 2019/0111965 A1* | 4/2019 | Matsumura | B62D 5/083 |
| 2021/0024126 A1* | 1/2021 | Matsumura | B62D 5/12 |

FOREIGN PATENT DOCUMENTS

| | | |
|---|---|---|
| JP | 2008-114708 A | 5/2008 |
| JP | 2015-214284 A | 12/2015 |
| JP | 2017-007409 A | 1/2017 |
| JP | 2018-122731 A | 8/2018 |
| KR | 10-2014-0033723 A | 3/2014 |
| WO | 2017/159107 A1 | 9/2017 |

* cited by examiner $$X_a = X_p + \frac{K_{sat}}{K_t \times (1+A_g)} \times X_p \mp \frac{f}{K_t \times (1+A_g)} \quad \cdots (4)$$

$$\underbrace{\phantom{\frac{K_{sat}}{K_t \times (1+A_g)} \times X_p}}_{X_2} \quad \underbrace{\phantom{\frac{f}{K_t \times (1+A_g)}}}_{X_3}$$

$$\alpha y = \frac{1}{1 + k_h \times V^2} \times \frac{V^2}{L} \times X_r$$

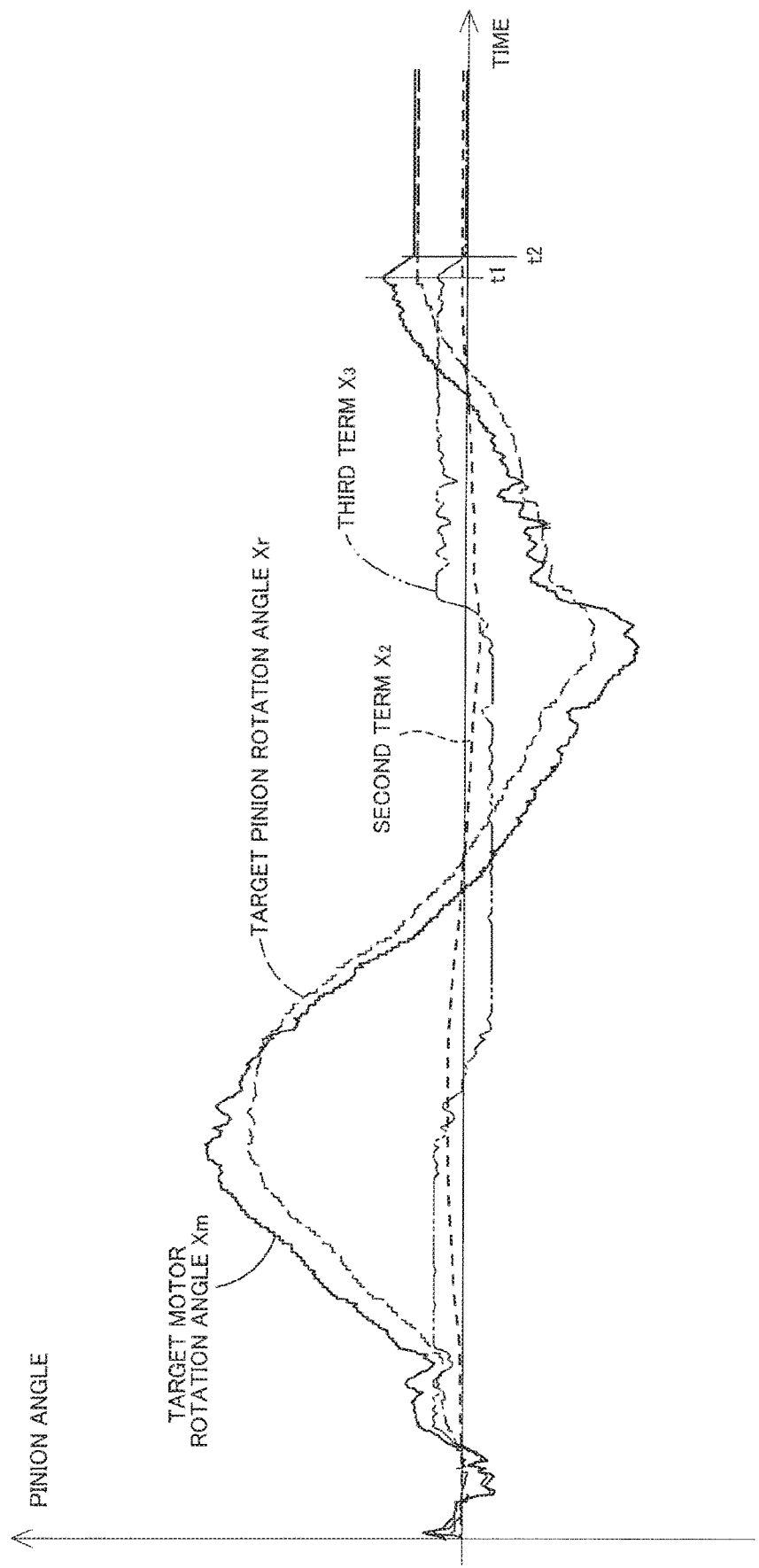

TURNING SYSTEM

CROSS REFERENCE TO RELATED APPLICATION

The present application claims priority from Japanese Patent Application No. 2018-227291, which was filed on Dec. 4, 2018, the disclosure of which is herein incorporated by reference in its entirety.

BACKGROUND

The following disclosure relates to a turning system mounted on a vehicle to turn a wheel.

Patent Document 1 (Japanese Patent Application Publication No. 2018-122731) discloses a turning system including an electric motor. The turning system disclosed in Patent Document 1 executes LTA (Lane Trace Assist) control. In the LTA control, in the case where a vehicle is traveling off a target traveling line, the electric motor is controlled to turn left and right wheels. This control brings the vehicle closer to the target traveling line.

SUMMARY

Accordingly, an aspect of the disclosure relates to a turning system including an electric turning mechanism and a hydraulic turning mechanism and configured to control an electric motor to accurately control a turning angle of each of a left wheel and a right wheel.

In one aspect of the disclosure, the turning system includes: an electric turning mechanism including an electric motor; and a hydraulic turning mechanism operable by a hydraulic pressure. In the present turning system, a torsion bar is engaged with a turning shaft via a steering gear box (hereinafter may be referred to as "gear box"). The electric motor rotates a portion of the torsion bar which is located upstream of the gear box. The hydraulic turning mechanism applies a hydraulic pressure to the turning shaft. As a result, a left wheel and a right wheel are turned. In the turning system, the turning angle of each of the left wheel and the right wheel is controlled by control of the electric motor. The control of the electric motor is executed based on a road-surface reaction force and a frictional force in the turning mechanism including the electric turning mechanism and the hydraulic turning mechanism.

In the case where a pinion gear is coupled to the torsion bar integrally and rotatably with the torsion bar, and the pinion gear is engaged with a tooth portion of a rack bar as the turning shaft in the gear box, the torsion bar is twisted by a difference between the rotation angle of the electric motor and the rotation angle of the pinion gear. Thus, in the case where the rotation angle of the electric motor is the same, the rotation angle of the pinion gear is smaller, and the stroke of the rack bar is smaller in the case where the angle of twist of the torsion bar is large than in the case where the angle of twist of the torsion bar is small. The rotation angle of the pinion gear is smaller in the case where the sum of the road-surface reaction force and the frictional force in the turning mechanism is large than in the case where the sum of the road-surface reaction force and the frictional force in the turning mechanism is small. In other words, the angle of twist of the torsion bar is larger in the case where the sum of the road-surface reaction force and the frictional force in the turning mechanism is large than in the case where the sum of the road-surface reaction force and the frictional force in the turning mechanism is small. This angle of twist of the torsion bar is a portion of the rotation angle of the electric motor which has not been transmitted to rotation of the pinion gear.

In view of the above, the rotation angle of the electric motor is controlled based on the road-surface reaction force and the frictional force in the turning mechanism to control the turning angle of each of the left wheel and the right wheel well.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIG. 10 is a view representing changes of a target rudder angle and so on in the case where LTA control is executed.

EMBODIMENT

Hereinafter, there will be described a steering assist system as one example of a turning system installed in a vehicle according to the present embodiment, by reference to the drawings.

Figure 1:
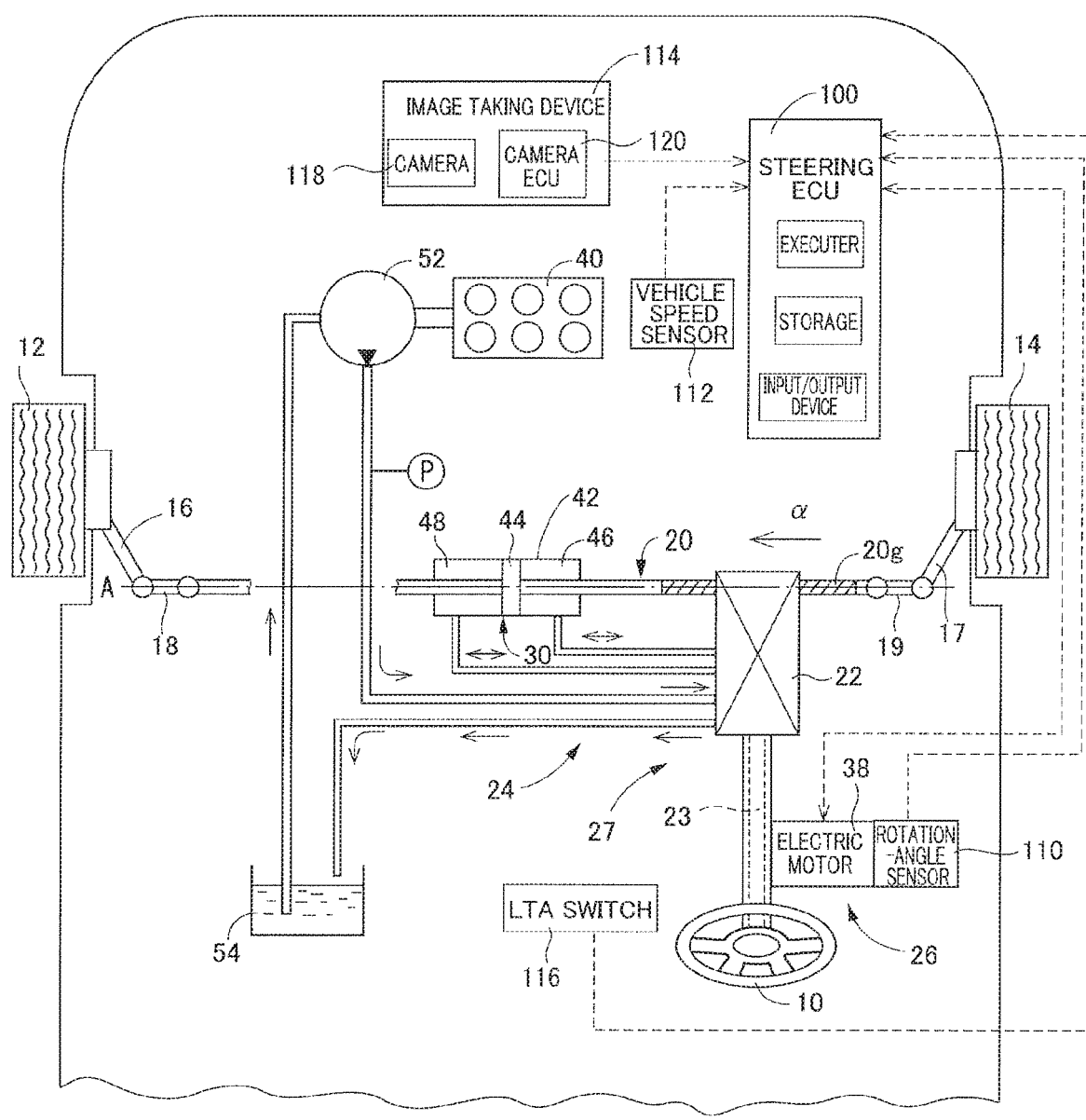
FIG. 1 is a schematic view of a turning system according to one embodiment.

As illustrated in FIG. 1, the steering assist system according to the present embodiment is configured to assist a driver with his or her operation of a steering wheel 10 as a steering operation member to turn front left and right wheels 12, 14 as steerable road wheels of the vehicle. The steering assist system also functions as an automatic turning system capable of turning the front left and right wheels 12, 14 even in the case where the steering wheel 10 as the steering operation member is not operated by the driver.

Figure 2:
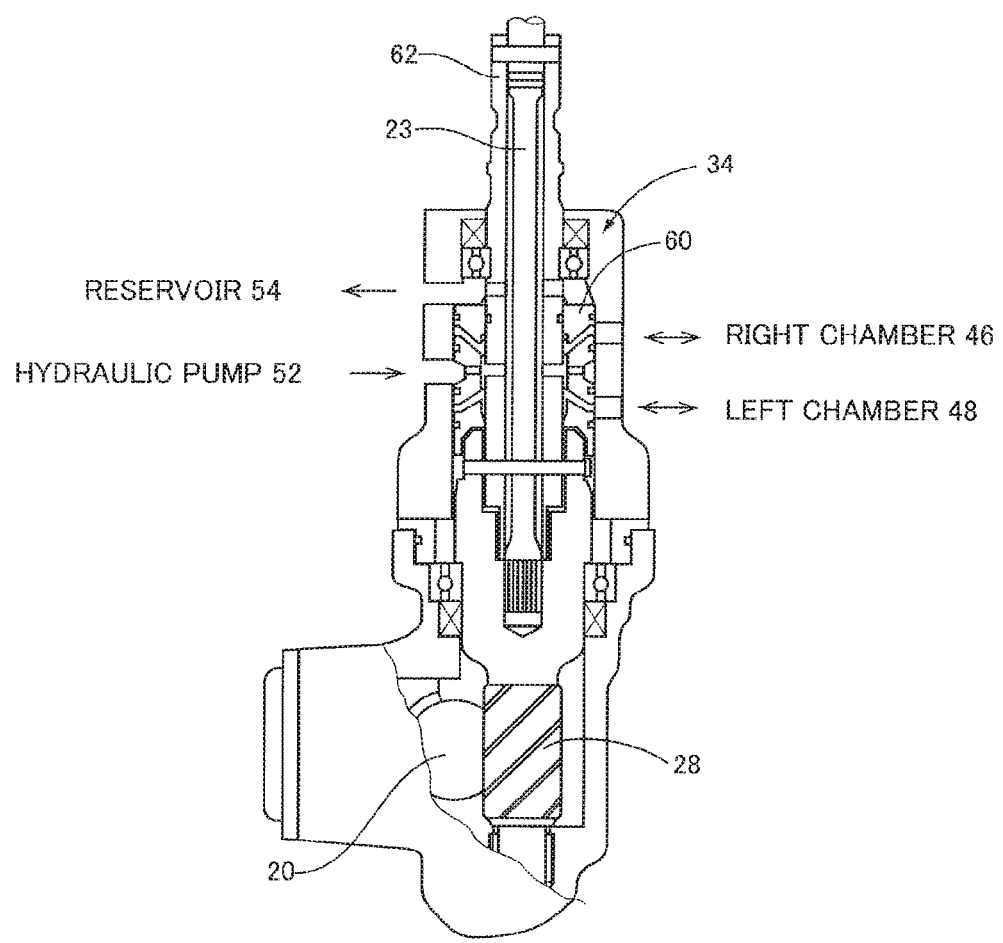
FIG. 2 is a cross-sectional of a gear box of a hydraulic assist mechanism of the turning system.

The front left and right wheels 12, 14 are coupled to each other by knuckle arms 16, 17, tie rods 18, 19, and a rack bar 20 as a turning shaft. The steering wheel 10 is coupled to the rack bar 20 via a steering gear box (hereinafter may be referred to simply as "gear box") 22. As illustrated in FIG. 2, the gear box 22 includes a rack-and-pinion mechanism. The steering wheel 10 is coupled to a pinion gear 28 via a steering shaft, a torsion bar 23, and so on. The pinion gear 28 is engaged with a tooth portion 20g of the rack bar 20 (see FIG. 1). With this configuration, rotation of the steering wheel 10 is converted to movement of the rack bar 20 in the widthwise direction of the vehicle (the right and left direction) to turn the front left and right wheels 12, 14. It is noted that one end portion of the torsion bar 23 is coupled to the pinion gear 28 so as to be integrally rotatable with the pinion gear 28, and the other end portion of the torsion bar 23 is coupled to the steering wheel 10 (the steering shaft) so as to be integrally rotatable with the steering wheel 10.

The present steering assist system includes an assist mechanism 27 as one example of a turning mechanism. The assist mechanism 27 includes a hydraulic assist mechanism 24 as one example of a hydraulic turning mechanism, and an electric assist mechanism 26 as one example of an electric turning mechanism. The hydraulic assist mechanism 24 includes a power cylinder 30 provided on the rack bar 20, and a control valve 34 provided on the gear box 22. The electric assist mechanism 26 includes an electric motor 38 that applies torque to the torsion bar 23. In other words, the electric motor 38 rotates the torsion bar 23.

The power cylinder 30 includes a housing 42, a piston 44 formed on the rack bar 20, and a right chamber 46 and a left chamber 48 partly defined by the piston 44. A hydraulic pump 52 and a reservoir 54 are connected to the right chamber 46 and the left chamber 48 via the gear box 22. The hydraulic pump 52 is driven by an engine 40.

Figure 3:
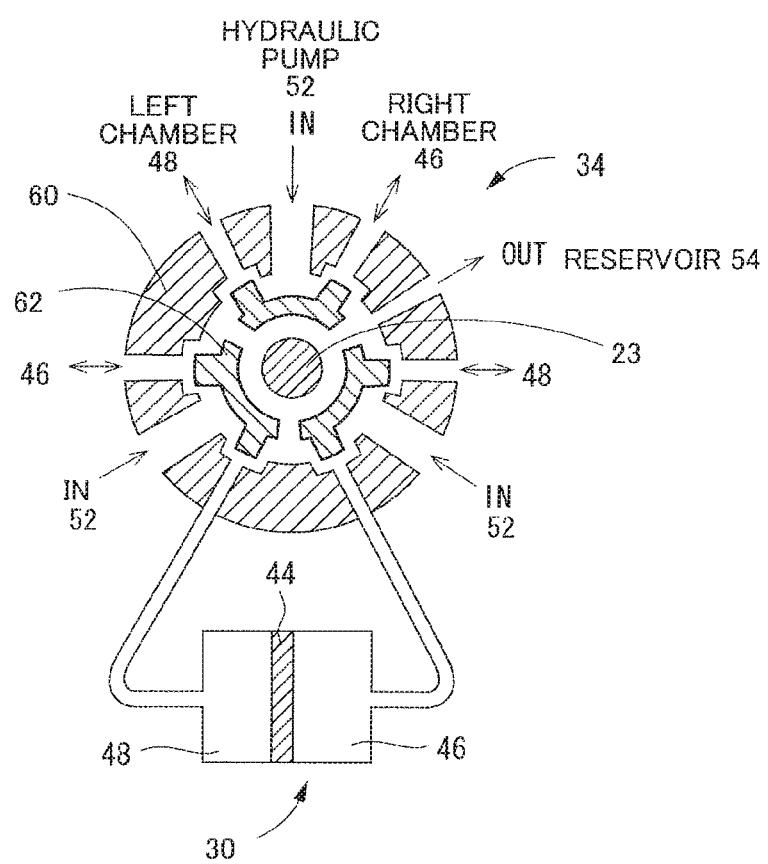
FIG. 3 is a cross-sectional view of a control valve of the gear box.

As illustrated in FIG. 3, the control valve 34 includes a rotary valve 60 and a control-valve shaft 62. One end portion of the control-valve shaft 62 is coupled to the torsion bar 23 so as to be integrally rotatable with the torsion bar 23. The rotary valve 60 has a plurality of liquid passages connected respectively to the hydraulic pump 52, the reservoir 54, the right chamber 46, and the left chamber 48 and extending in the radial direction of the rotary valve 60. A plurality of grooves and so on are in an outer circumferential portion of the control-valve shaft 62. Changes of the phase of the control-valve shaft 62 relative to the rotary valve 60 control the area of a liquid passage between each of the hydraulic pump 52 and the reservoir 54 and each of the right chamber 46 and the left chamber 48.

In FIG. 3, for example, rotation of the control-valve shaft 62 in the right direction increases the area of the liquid passage between the hydraulic pump 52 and the right chamber 46 and reduces the area of the liquid passage between the hydraulic pump 52 and the left chamber 48. The rotation also increases the area of the liquid passage between the reservoir 54 and the left chamber 48 and reduces the area of the liquid passage between the reservoir 54 and the right chamber 46. The working liquid is supplied from the hydraulic pump 52 to the right chamber 46, and a flow of the working liquid from the left chamber 48 to the reservoir 54 is allowed. A moving force in the direction indicated by arrow a (see FIG. 1) is applied to the rack bar 20, which turns the front left and right wheels 12, 14 in the right direction. Rotation of the control-valve shaft 62 in the left direction increases the area of the liquid passage between the hydraulic pump 52 and the left chamber 48 and reduces the area of the liquid passage between the hydraulic pump 52 and the right chamber 46. The rotation also increases the area of the liquid passage between the reservoir 54 and the right chamber 46 and reduces the area of the liquid passage between the reservoir 54 and the left chamber 48. The working liquid is supplied from the hydraulic pump 52 to the left chamber 48, and a flow of the working liquid from the right chamber 46 to the reservoir 54 is allowed. A moving force in a direction reverse to the direction indicated by the arrow a is applied to the rack bar 20, which turns the front left and right wheels 12, 14 in the left direction.

In the control valve 34, the phase of the control-valve shaft 62 relative to the rotary valve 60 changes with a twist of the torsion bar 23. Thus, the following relationship is established between torque T applied to the torsion bar 23 and a hydraulic pressure controlled by the control valve 34 in the control valve 34: the hydraulic pressure controlled by the control valve 34 is higher (that is, a force in an axial direction A which is applied to the turning shaft 20 by the hydraulic assist mechanism 24 is larger) in the case where the absolute value of the torque T is large than in the case where the absolute value of the torque T is small. The valve characteristic as this relationship is determined by the shapes of the control-valve shaft 62 and the rotary valve 60, for example.

In the electric assist mechanism 26, torque that assists the driver with his or her operation of the steering wheel 10 is applied to the torsion bar 23 by the electric motor 38. In some cases, the torque is applied to the torsion bar 23 even in the case where the steering wheel 10 is not operated by the driver. In the present embodiment, as illustrated in FIG. 1, the electric assist mechanism 26 is provided on the torsion bar 23 at a position nearer to the steering wheel 10 than the gear box 22, in other words, the electric assist mechanism 26 is provided at the position located upstream of the gear box 22. The electric assist mechanism 26 and the hydraulic assist mechanism 24 are provided in series. Accordingly, the torque is applied to the torsion bar 23 by the electric motor 38, and a moving force produced by a hydraulic pressure related to the torque applied to the torsion bar 23 by the electric motor 38 is applied to the rack bar 20 by the hydraulic assist mechanism 24. Thus, acting forces of the electric assist mechanism 26 and the hydraulic assist mechanism 24 move the rack bar 20 to turn the front left and right wheels 12, 14.

The steering assist system includes a steering ECU 100 principally constituted by a computer. The steering ECU 100 includes an executer, a storage, and an input/output device. Devices connected to the input/output device include: a rotation-angle sensor 110 configured to detect a rotation angle of the electric motor 38; a vehicle speed sensor 112 configured to detect a running speed of the vehicle; an image taking device 114 provided in the vehicle; an LTA (Lane Trace Assist) switch 116; and the electric motor 38.

Figure 6:
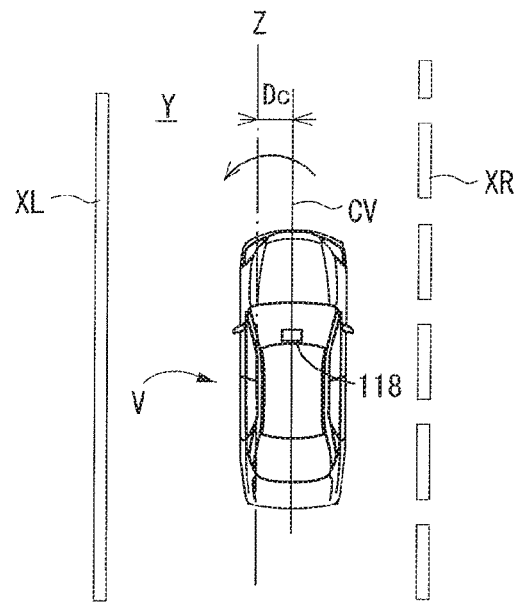
FIG. 6 is a view of a vehicle installed with the turning system, and a situation around the vehicle.

The vehicle speed sensor 112 is, for example, configured to obtain a vehicle speed based on rotational speeds of four wheels including the front left and right wheels 12, 14. The image taking device 114 includes: a camera 118 configured to take an image representing a front side and front lateral sides of the vehicle; and a camera ECU 120 configured to process the image taken by the camera 118, for example. The camera ECU 120 is principally constituted by a computer. As illustrated in FIG. 6, the camera ECU 120, based on the image taken by the camera 118, identifies lane lines XR, XL located on opposite sides of the present vehicle V (which is installed with the image taking device 114 and which may be hereinafter referred to as "own vehicle") and thereby identifies a lane Y on which the own vehicle V is traveling, to obtain a target traveling line Z. The camera ECU 120 further obtains a relative positional relationship between the target traveling line Z and the own vehicle V. This relationship may be represented by an amount of a deviation Dc that is a distance between a center line CV of the own vehicle V and the target traveling line Z, for example. The target traveling line Z extends through the center of the lane Y, for example. The LTA switch 116 is operable by the driver and is turned to ON to allow LTA control.

The steering assist system configured as described above executes the LTA control. In the present embodiment, the LTA control is turning control for controlling the own vehicle V to travel along the target traveling line Z. In the LTA control, for example, a target rotation angle Xr of the pinion gear 28 (hereinafter may be referred to as "target pinion rotation angle Xr") is obtained as a target rudder angle such that the own vehicle V can travel along the target traveling line Z obtained by the camera ECU 120 and such that the amount of the deviation Dc is reduced. Furthermore, the electric motor 38 is controlled so as to bring an actual rotation angle of the pinion gear 28 closer to the target pinion rotation angle Xr.

The rack bar 20 is moved in the axial direction A with rotation of the pinion gear 28, which turns the front left and right wheels 12, 14. Thus, a predetermined relationship is established among the rotation angle of the pinion gear 28, an amount of movement of the rack bar 20, and the turning angle of each of the front left and right wheels 12, 14. Accordingly, in the present embodiment, the target pinion rotation angle Xr is obtained, and the electric motor 38 is controlled based on the rotation angle of the pinion gear 28.

Also, the front left and right wheels 12, 14 are automatically turned by control of the electric motor 38. In the case where the LTA control is to be executed, the driver is not performing an operation for rotating the steering wheel 10 in most cases. Thus, it is possible to consider that torque caused by the electric motor 38 is applied to the torsion bar 23 without an operating force of the steering wheel 10 by the driver being applied to the torsion bar 23.

However, since the electric assist mechanism 26 is mounted upstream of the torsion bar 23, the rotation angle of the pinion gear 28 is less than the rotation angle of the electric motor 38 by an amount of twist of the torsion bar 23. The angle Xt of twist of the torsion bar 23 is larger in the case where a road-surface reaction force is large, and a frictional force in the assist mechanism 27 is large than in the case where the road-surface reaction force is small, and a frictional force in the assist mechanism 27 is small. Thus, in the present embodiment, the angle Xt of twist of the torsion bar 23 is estimated based on the road-surface reaction force and the frictional force in the assist mechanism 27, and the angle that is the sum of the target pinion rotation angle Xr and the angle Xt of twist of the torsion bar 23 is set to a target motor rotation angle Xm (=Xr+Xt). A detailed explanation will be provided below.

In the present embodiment, the electric assist mechanism 26 and the hydraulic assist mechanism 24 move the rack bar 20 in the axial direction A, i.e., in the widthwise direction of the vehicle (the right and left direction) to turn the front left and right wheels 12, 14. An axial force F applied to the rack bar 20 by the electric assist mechanism 26 and the hydraulic assist mechanism 24 (a force applied in the axial direction A) is the sum of an axial force Fm applied by the electric assist mechanism 26 and an axial force Fp applied by the hydraulic assist mechanism 24 (the power cylinder 30) (F=Fm+Fp). Each of the axial forces Fm, Fp is expressed by the following equation:

$$Fm = Kt \times (Xa - Xp)$$

$$Fp = Ag \times Fm$$

where Xa is the rotation angle of the electric motor 38, Xp is the rotation angle of the pinion gear 28, Kt is the stiffness of the torsion bar 23, and Ag is a proportionality constant. The above-described stiffness Kt is a constant, a value of which is determined based on a vehicle speed V and the rotation angle Xp of the pinion gear 28. Since a hydraulic pressure in the power cylinder 30 is higher in the case where the torque applied to the torsion bar 23 is large than in the case where the torque applied to the torsion bar 23 is small, it is possible to consider that the axial force Fp is a value which is proportional to the axial force Fm (the proportionality constant in this case is defined as "Ag"). The following equation is obtained by merging the above-described equations:

$$F = Kt \times (1 + Ag) \times (Xa - Xp) \quad (1)$$

Figure 4:
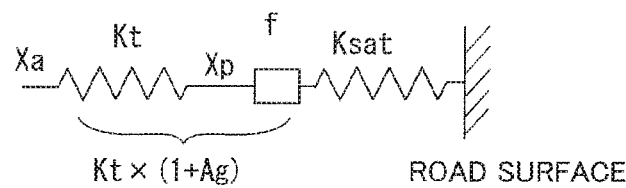
FIG. 4 is a view conceptually representing a configuration of the turning system.

The road-surface reaction force is the sum of (i) a front-left-wheel road-surface reaction force acting between a tire on the front left wheel 12 and the road surface and (ii) a front-right-wheel road-surface reaction force acting between a tire on the front right wheel 14 and the road surface. The road-surface reaction force Fs is expressed by the following equation:

$$Fs = Ksat \times Xp \quad (2)$$

where Ksat is the tire stiffness which is the sum of the stiffness of the tire on the front left wheel 12 and the stiffness of the tire on the front right wheel 14. The tire stiffness Ksat is a constant, a value of which is determined based on the vehicle speed V. As conceptually illustrated in FIG. 4, the axial force F applied by the assist mechanism 27 is equal to the sum of the road-surface reaction force and a frictional force f produced in the assist mechanism 27, and accordingly the following equation is obtained:

$$Kt \times (1 + Ag) \times (Xa - Xp) = Ksat \times Xp \pm f \quad (3)$$

Deforming equation (3) yields:

$$Xa = Xp + X_2 + X_{3'} \quad (4)$$

In equation (4), the second term $X_2$ can be expressed by the following equation:

$$X_2 = Ksat \times Xp / \{Kt \times (1 + Ag)\}$$

The third term $X_{3'}$ can be expressed by the following equation:

$$X_{3'} = -[\pm f / \{Kt \times (1 + Ag)\}]$$

In the present embodiment, a value obtained by multiplying the third term $X_{3'}$ by a position-related value $Dir_{(n)}$ which will be described below is used as a third term $X_a$.

$$X_3 = Dir_{(n)} \times X_{3'}$$

Substituting the target pinion rotation angle Xr into the first term Xp in equation (4) yields the target motor rotation angle Xm that is a target value of the rotation angle Xa of the electric motor 38.

$$Xm = Xr + X_2 + X_3 \quad (5)$$

In equation (5), the sum $(X_2 + X_3)$ of the second term $X_2$ and the third term $X_3$ corresponds to the angle Xt of twist of the torsion bar 23.

There will be described the second term $X_2$. In equation (1), the stiffness $Kt \times (1 + Ag)$ of the assist mechanism 27 can be obtained based on the axial force F applied to the rack bar 20 or lateral acceleration αy. The axial force F can be represented as a value obtained by multiplying the lateral acceleration αy by an axle weight M (F=αy×M). Since the axle weight M is a predetermined constant, it is possible to consider that the axial force F is determined based on the lateral acceleration αy. The lateral acceleration αy can be expressed by a value obtained by multiplying a yaw rate γ by the vehicle speed V (αy=γ×V). The yaw rate γ can be expressed by the following equation:

$$\gamma = \{1 / (1 + Kh \times V^2)\} \times (V/L) \times Xp \quad (6)$$

where Kh is a stability factor, V is the vehicle speed, Xp is the rotation angle of the pinion gear 28, and L is a wheelbase. Since each of the stability factor Kh and the wheelbase L is a predetermined constant in equation (6), the yaw rate γ is obtained by substituting the vehicle speed V detected by the vehicle speed sensor 112 and the target pinion rotation angle Xr as the rotation angle Xp of the pinion gear 28 into equation (6). The lateral acceleration αy is obtained by multiplying the yaw rate γ by the vehicle speed V. That is, the lateral acceleration αy caused in the case where the pinion gear 28 is rotated by the target pinion rotation angle Xr is obtained.

$$\alpha y = \{1/(1+Kh \times V^2)\} \times (V/L) \times V \times Xr \tag{7}$$

Figure 5:
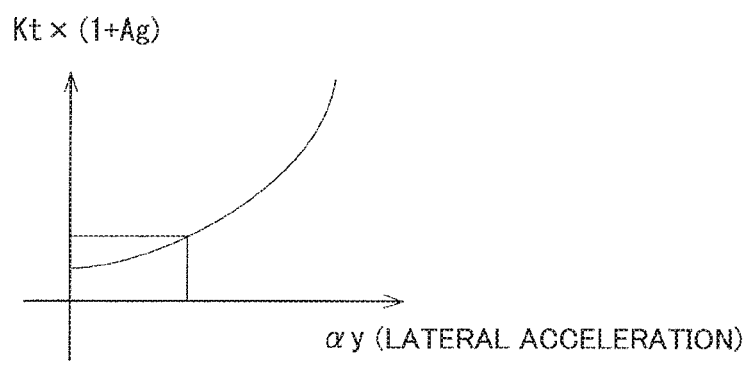
FIG. 5 is a view representing a relationship between lateral acceleration and the stiffness of the turning system which is stored in a storage of a steering ECU of the turning system.

As illustrated in FIG. 5, the lateral acceleration αy and the stiffness Kt×(1+Ag) of the assist mechanism 27 have a relationship in which the stiffness Kt×(1+Ag) increases in a curved fashion with increase in the lateral acceleration αy. In the present embodiment, a relationship between the lateral acceleration αy and the stiffness Kt×(1+Ag) of the assist mechanism 27 is stored in advance. In the present embodiment, the stiffness Kt×(1+Ag) is calculated based on the obtained lateral acceleration αy and the relationship illustrated in FIG. 5.

The tire stiffness Ksat is then obtained. It is possible to consider that self-aligning torque applied to each of the front left wheel 12 and the front right wheel 14 is substantially proportional to a slip angle in a region in which the slip angle (the turning angle) of each of the front left wheel 12 and the front right wheel 14 is less than or equal to a set angle. It is also possible to consider that the slip angle is proportional to the rotation angle Xp of the pinion gear 28. Thus, self-aligning torque SAT applied to the front left wheel 12 and the front right wheel 14 can be expressed by the following equation:

$$SAT = Ksat \times Xp$$

The self-aligning torque SAT is proportional to the lateral acceleration αy in a range in which the LTA control is executed (e.g., the lateral acceleration αy<0.3 G). Thus, the following equations are obtained based on equation (6):

$$SAT = w \times \alpha y$$

$$Ksat \times Xp = w \times \{1/(1+Kh \times V^2)\} \times (V/L) \times V \times Xp \tag{8}$$

where w is a proportionality constant. The tire stiffness Ksat can be expressed by the following equation based on equation (8):

$$Ksat = w \times \{1/(1+Kh \times V^2)\} \times (V/L) \times V \tag{9}$$

In other words, the tire stiffness Ksat is obtained by dividing the self-aligning torque SAT by the rotation angle Xp of the pinion gear 28. That is, it is possible to consider that the tire stiffness Ksat is a value obtained by dividing both sides of equation (8) by the rotation angle Xp of the pinion gear 28 and is a value obtained by multiplying lateral-acceleration stiffness αygain by the proportionality constant w. The lateral-acceleration stiffness represents difficulty in occurrence of the lateral acceleration and is obtained by dividing the lateral acceleration αy by the rotation angle Xp of the pinion gear 28. As described above, the lateral-acceleration stiffness αygain is obtained by multiplying yaw-rate stiffness γgain by the vehicle speed V, and the yaw-rate stiffness γgain can be expressed by the following equation:

$$\gamma gain = \{1/(1+Kh \times V^2)\} \times (V/L)$$

where Kh is the stability factor, V is the vehicle speed, and L is the wheelbase. The lateral-acceleration stiffness αygain is obtained by multiplying the yaw-rate stiffness γgain by the vehicle speed V as in the following equation:

$$\alpha y\, gain = \{1/(1+Kh \times V^2)\} \times (V/L) \times V$$

The tire stiffness Ksat is obtained by multiplying the lateral-acceleration stiffness αygain by the proportionality constant w as in the following equation:

$$Ksat = w \times \{1/(1+Kh \times V^2)\} \times (V/L) \times V \tag{10}$$

Equation (10) is the same as equation (9).

There will be described the third term $X_3$. A value measured in advance (an experimental value) is used as the frictional force f. It is possible to consider that the third term $X_3$ is a portion of the target motor rotation angle Xm (specifically, a portion of the angle of twist of the torsion bar 23) which is contributed by the frictional force. If the third term $X_3'$ is used, the sign (+, −) of the frictional force is inverted depending upon a direction of movement of the rack bar 20. Since the frictional force is constant, when the sign is inverted, the target motor rotation angle changes by an amount corresponding to the frictional force, which may cause hunting. To solve this problem, in the present embodiment, a value $X_3$ obtained by multiplying the third term $X_3'$ by the position-related value $Dir_{(n)}$ is used to reduce changes of the third term.

The position-related value $Di_{(n)}$ is determined by a value obtained by integrating the rotation angle of the pinion gear 28, i.e., the target pinion rotation angle Xr. The position-related value $Di_{(n)}$ is expressed by the following equation:

$$Dir_{(n)} = Dir_{(n-1)} + Ga \times \Delta Xr_{(n)}$$

$$\Delta Xr_{(n)} = Xr_{(n)} - Xr_{(n-1)} \tag{11}$$

where Ga is a gain. The position-related value $Dir_{(n)}$ is a value between −1 and +1 and limited by the lower limit value (−1) and the upper limit value (+1).

In the case where the rotation angle of the electric motor 38 contains a value of the third term in an angle keeping state, an offset occurs in some cases during straight traveling of the vehicle, which may give discomfort to the driver. The angle keeping state is a state in which a state in which the absolute value ($|\Delta Xr_{(n)}| = |Xr_{(n)} - Xr_{(n-1)}|$) of an amount of change of the target pinion rotation angle Xr is substantially equal to zero has continued for a length of time that is greater than or equal to a set length of time. A delay is caused in the case where an inversion is performed in the angle keeping state (in the case where a direction of change of the target pinion rotation angle Xr is inverse to a direction of change of the target pinion rotation angle Xr in a period before the angle keeping state is established). To solve this problem, in the present embodiment, in the case where the angle keeping state is detected, the absolute value of the position-related value Dir is gradually decreased to zero. As a result, the absolute value of the third term $X_3$ can be gradually brought closer to zero.

As described above, the angle Xt of twist of the torsion bar 23 is obtained by substituting the values into the second term $X_2$ and the third term $X_3$ and calculating the sum of the second term $X_2$ and the third term $X_3$, and the target motor rotation angle Xm is obtained by adding the angle Xt of twist of the torsion bar 23 to the first term Xr. The electric motor 38 is rotated by the target motor rotation angle Xm, and thereby the pinion gear 28 is rotated, which moves the rack bar 20, thereby turning the front left and right wheels 12, 14. This enables the own vehicle to travel along the target traveling line.

Figure 7:
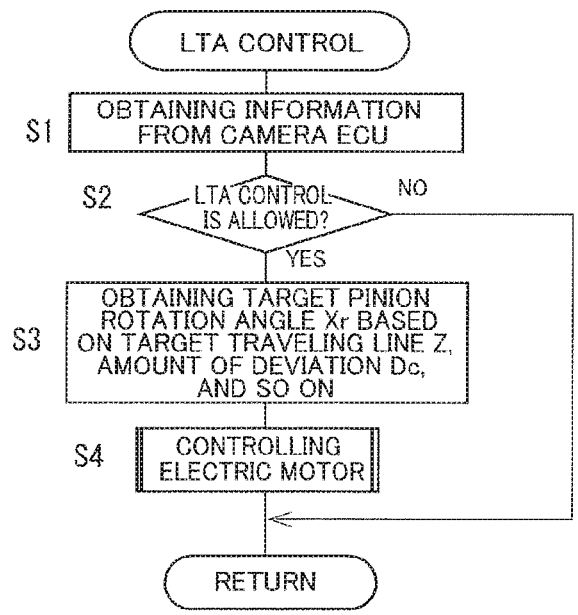
FIG. 7 is a flowchart representing an LTA control program stored in the storage.

An LTA control program represented by the flowchart in FIG. 7 is executed by the steering ECU 100 each time when a predetermined set length of time has elapsed. At S1, information supplied from the camera ECU 120 is read. This information includes the target traveling line Z and the amount of the deviation Dc. At S2, it is determined whether the LTA control is allowed. For example, in the case where the LTA switch 116 has been turned to ON, it is determined that the LTA control is allowed. In modifications, it may be determined that the LTA control is allowed, in the case where a direction indicating switch, not illustrated, is OFF or in the case where the vehicle speed V is greater than or equal to a set speed, for example. In the case where the LTA control is allowed, the target pinion rotation angle Xr is at S3 obtained based on the target traveling line Z, the amount of the deviation Dc, and so on. At S4, the electric motor 38 is controlled.

Figure 8:
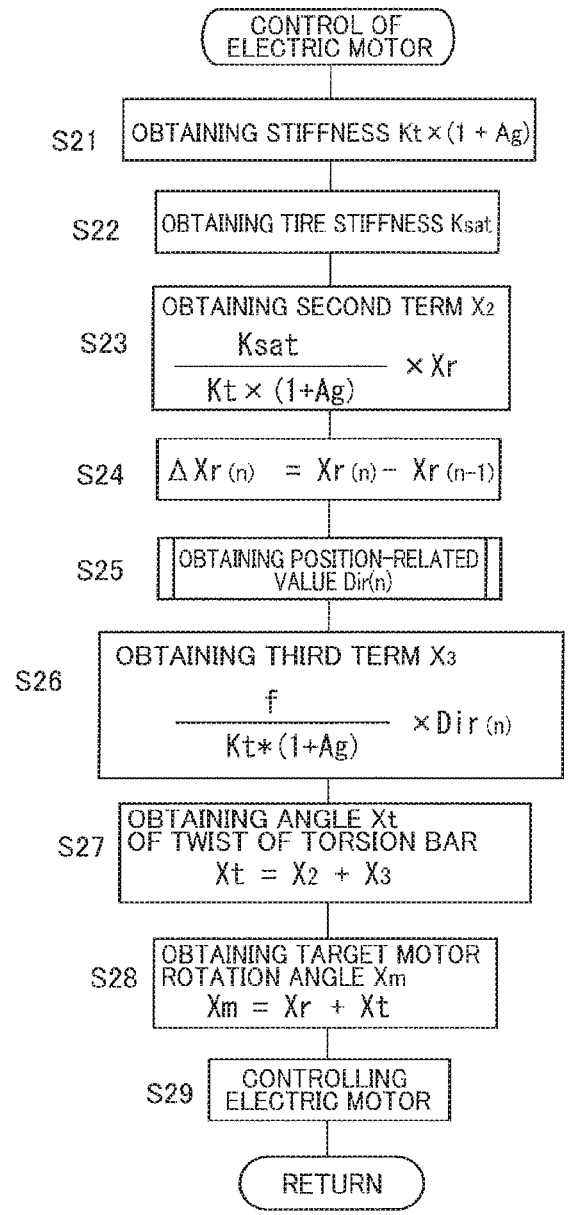
FIG. 8 is a flowchart representing a portion of the LTA control program.

The routine in FIG. 8 represents the processing at S4. At S21, the stiffness Kt×(1+Ag) of the assist mechanism 27 (the electric assist mechanism 26 and the hydraulic assist mechanism 24) is obtained. The tire stiffness Ksat is obtained at S22. The second term $X_2$ is obtained at S23 ($X_2$=[Ksat/{Kt×(1+Ag)}]×Xr). The value of the second term $X_2$ is obtained by multiplying a ratio between the stiffness Kt×(1+Ag) and the tire stiffness Ksat, by the target pinion rotation angle Xr. At S24, a change value $\Delta Xr_{(n)}$ of the target pinion rotation angle Xr is obtained. The position-related value $Di_{(n)}$ is obtained at S25. The position-related value $Dir_{(n)}$ will be described later. At S26, the third term $X_3$ is obtained by the following equation:

$$X_3 = -[\pm Dir_{(n)} \times f/\{Kt \times (1+Ag)\}]$$

At S27, the angle Xt of twist of the torsion bar 23, i.e., the sum of the second term $X_2$ and the third term $X_3$ is obtained. The target motor rotation angle Xm is obtained at S28. At S29, the current to be supplied to the electric motor 38 is controlled such that the actual rotation angle of the electric motor 38 is brought closer to the target motor rotation angle Xm.

Figure 9:
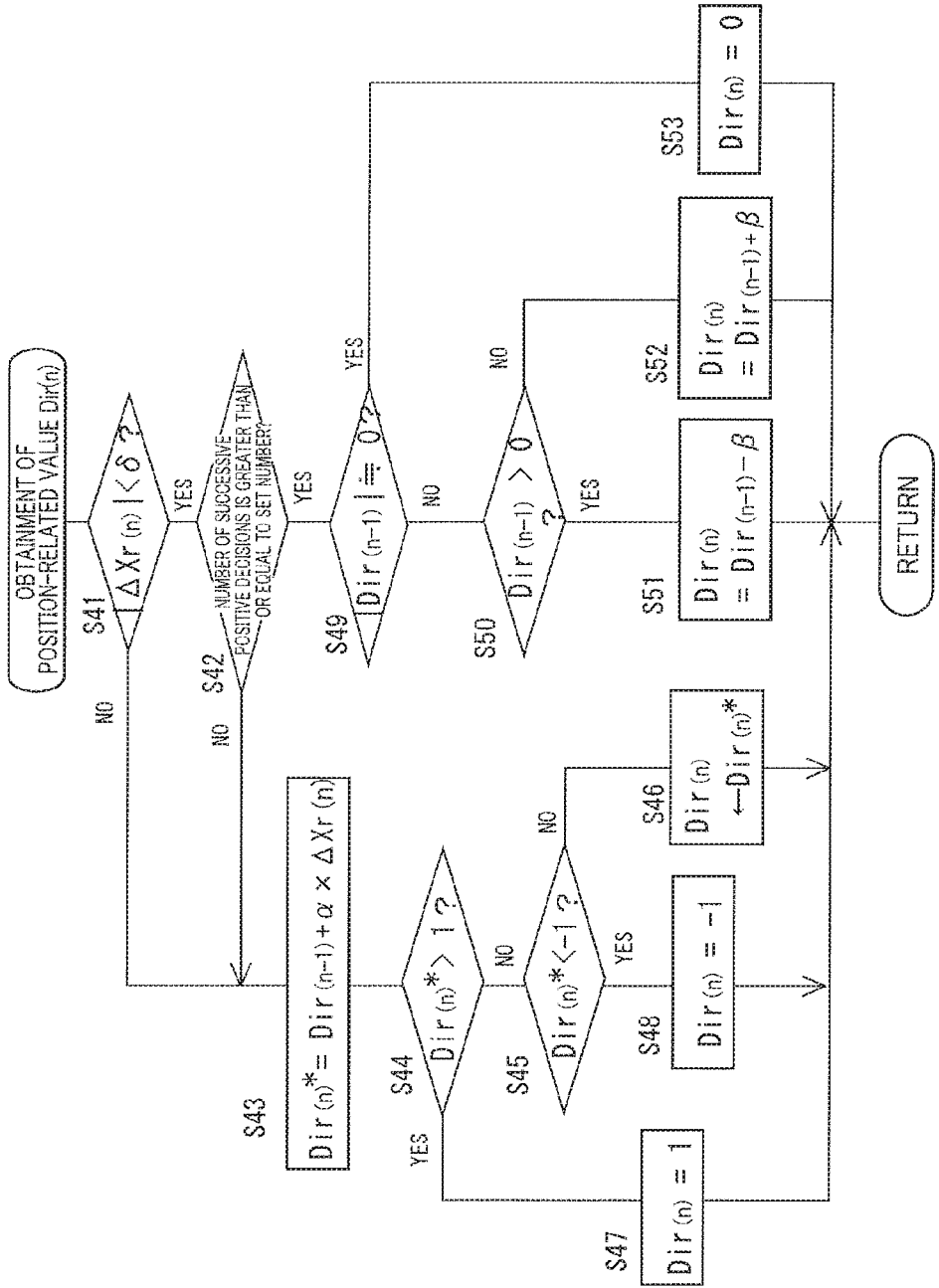
FIG. 9 is a flowchart representing another portion of the LTA control program.

The position-related value $Di_{(n)}$ is obtained according to the flowchart in FIG. 9. At S41 and S42, it is determined whether the vehicle is in the angle keeping state. Specifically, it is determined at S41 whether the absolute value of the change value $\Delta Xr_{(n)}$ of the target pinion rotation angle Xr which is obtained at S24 is less than a set value δ. The set value δ is such a value that enables the steering assist system to determine that the driver is not performing a steering operation. At S42, it is determined whether or not the number of successive positive decisions (YES) at S41 is greater than or equal to a set number. When a positive decision (YES) is made at S42, it is determined that the vehicle is in the angle keeping state. When a negative decision (NO) is made at any of S41 and S42, it is determined that the vehicle is not in the angle keeping state.

When the vehicle is not in the angle keeping state, a temporary position-related value $Di_{(n)}*$ is at S43 obtained according to equation (10). It is determined at S44 whether the temporary position-related value $Di_{(n)}*$ is greater than 1. It is determined at S45 whether the temporary position-related value $Dir_{(n)}*$ is less than −1. When negative decisions (NO) are made at S44 and S45, the current position-related value $Dir_{(n)}$ is at S46 set to the temporary position-related value $Di_{(n)}*$ obtained according to equation (10), i.e., a value greater than or equal to −1 and less than or equal to 1. When a positive decision (YES) is made at S44, the current position-related value $Dir_{(n)}$ is at S47 set to 1. When a positive decision (YES) is made at S45, the current position-related value $Di_{(n)}$ is set at S48 to −1.

When the vehicle is in the angle keeping state, it is determined at S49 whether the absolute value of a previous position-related value $Dir_{(n-1)}$ is substantially equal to zero. When a negative decision (NO) is made at S49, it is determined at S50 whether the previous position-related value $Dir_{(n-1)}$ is greater than zero, that is, it is determined whether the sign is positive or negative. When the sing is positive, the current position-related value $Di_{(n)}$ at S51 is not calculated according to equation (10) but set to a value that is less than the previous position-related value $Dir_{(n-1)}$ by a set value β. That is, the current position-related value $Dir_{(n)}$ is set such that the absolute value of the current position-related value $Di_{(n)}$ is less than that of the previous position-related value $Dir_{(n-1)}$, and thereby the current position-related value $Dir_{(n)}$ is brought closer to zero. When a negative decision (NO) is made at S50 and when the sign is negative, the current position-related value $Dir_{(n)}$ is at S52 set to a value that is greater than the previous position-related value $Dir_{(n-1)}$ by the set value β. That is, the current position-related value $Di_{(n)}$ is set such that the absolute value of the current position-related value $Dir_{(n)}$ is less than that of the previous position-related value $Dir_{(n-1)}$, and thereby the current position-related value $Di_{(n)}$ is brought closer to zero. The set value β is a relatively small value having a magnitude for bringing a value, of which absolute value is less than or equal to one, closer to zero. When a positive decision (YES) is made at S49, the current position-related value $Dir_{(n)}$ is set to zero at S53. The current position-related value $Di_{(n)}$ is at S53 set to zero in the case where the processings at S41-S52 are repeated executed in the angle keeping state to bring the position-related value $Dir_{(n)}$ closer to zero, and thereby a positive decision (YES) is made at S49, or in the case where the previous position-related value $Dir_{(n-1)}$ is equal to a value close to zero when the processing at S49 is executed for the first time.

FIG. 10 indicates the target pinion rotation angle Xr, the second term $X_2$, the third term $X_3$, and the target motor rotation angle Xm obtained in the LTA control in the present embodiment. As illustrated in FIG. 10, the target motor rotation angle Xm is determined to a value, of which absolute value is greater than the target pinion rotation angle Xr in the LTA control by the angle Xt of twist of the torsion bar 23. Thus, the electric motor 38 is controlled with consideration of the rotation angle of the electric motor 38 which does not contribute to movement of the rack bar 20. This configuration makes it possible to bring the actual rotation angle of the pinion gear 28 closer to the target pinion rotation angle Xr, thereby accurately controlling the turning angle of each of the front left and right wheels 12, 14.

Since the position-related value $Di_{(n)}$ is used, changes of the target pinion rotation angle Xr are reduced, making it difficult to cause hunting. It is detected that the vehicle is in the angle keeping state at time t1, then the third term $X_3$ is gradually decreased and becomes zero at time t2, and the target motor rotation angle Xm becomes substantially equal to the target pinion rotation angle Xr. As a result, it is possible to reduce a delay in the inversion, for example.

In the present embodiment as described above, portions of the steering ECU 100 which store and execute the LTA control program represented by the flowchart in FIG. 7 constitute an electric-motor controller, for example. Portions of the electric-motor controller which store and execute the processing at S27 constitute a twist-angle obtainer. Portions of the electric-motor controller which store and execute the processing at S3 constitute a target-pinion-angle determiner.

Portions of the electric-motor controller which store and execute the processing at S28 constitute a target-motor-rotation-angle determiner. Portions of the electric-motor controller which store and execute the processings at S22 and S23 constitute a road-surface-reaction-force obtainer. Portions of the electric-motor controller which store and execute the processing at S29 constitute a supply-current controller. It is noted that the right wheel corresponds to a front right wheel, and the left wheel corresponds to the front left wheel.

In some case, the electric motor 38 of the electric assist mechanism 26 is provided with a speed reducer, and the rotational speed of the electric motor 38 is reduced by the speed reducer and applied to the torsion bar 23. In this case, the torsion bar 23 is twisted by a difference between the rotation speed of the output shaft of the electric motor 38 with the speed reducer and the rotation speed of the pinion gear 28. The target motor rotation angle Xm that is a target rotation speed of the electric motor 38 with the speed reducer is obtained by adding the angle of twist of the torsion bar 23 to the target pinion rotation angle Xr.

Using the position-related value $Di_{(n)}$ is not essential. Instead of the position-related value $Di_{(n)}$, the steering assist system may use a value that is obtained by differentiating the target pinion rotation angle, processing the obtained value with a low-pass filter, and thereafter limiting it with a lower limit value (−1) and an upper limit value (+1), for example.

In the above-described embodiment, the above-described LTA control is one example. For example, as the LTA control, the steering assist system may control the front left and right wheels 12, 14 to turn such that the own vehicle V does not travel off the lane Y.

The value obtained by multiplying the tire stiffness Ksat by the target pinion rotation angle Xr at least needs to correspond to the road-surface reaction force and may be a lateral force Fy, for example. The lateral force Fy may be calculated by multiplying the lateral acceleration αy by the axle weight M (Fy=αy×M). It is to be understood that the disclosure is not limited to the details of the illustrated embodiment, but may be embodied with various changes and modifications, which may occur to those skilled in the art, without departing from the spirit and scope of the disclosure.

Claimable Inventions

There will be described claimable inventions.

(1) A turning system configured to move a turning shaft to turn a left wheel and a right wheel of a vehicle, the turning shaft being configured to couple the left wheel and the right wheel to each other, a torsion bar being engaged with the turning shaft via a steering gear box, the turning system comprising:

a turning mechanism comprising (i) an electric turning mechanism comprising an electric motor configured to rotate a portion of the torsion bar which is located upstream of the steering gear box and (ii) a hydraulic turning mechanism configured to apply a moving force to the turning shaft in an axial direction, the moving force being produced by a hydraulic pressure; and an electric-motor controller configured to control the electric motor based on a frictional force in the turning mechanism and a road-surface reaction force that acts between (a) a tire on the left wheel and a tire on the right wheel and (b) a road surface.

The road-surface reaction force that acts between (a) the tire on the left wheel and the tire on the right wheel and (b) the road surface is the sum of a left-wheel road-surface reaction force acting between the tire on the left wheel and the road surface and a right-wheel road-surface reaction force acting between the tire on the right wheel and the road surface.

(2) The turning system according to the above form (1), wherein the electric-motor controller comprises a twist-angle obtainer configured to obtain an angle of twist of the torsion bar based on the frictional force in the turning mechanism and the road-surface reaction force, and the electric-motor controller is configured to control the electric motor based on the angle of twist of the torsion bar which is obtained by the twist-angle obtainer.

(3) The turning system according to the above form (2), wherein the steering gear box comprises a rack-and-pinion mechanism, wherein the torsion bar is coupled rotatably and integrally with a pinion gear, wherein the pinion gear is engaged in the steering gear box with a tooth portion of a rack bar that is the turning shaft, and wherein the electric-motor controller comprises:
a target-pinion-rotation-angle determiner configured to determine a target pinion rotation angle based on a state of the vehicle, the target pinion rotation angle being a target rotation angle of the pinion gear;
a current controller configured to control a current to be supplied to the electric motor, such that an actual rotation angle of the electric motor is brought closer to a target motor rotation angle that is a target rotation angle of the electric motor; and
a target-motor-rotation-angle determiner configured to determine the target motor rotation angle to a value obtained by adding the angle of twist of the torsion bar which is obtained by the twist-angle obtainer, to the target pinion rotation angle determined by the target-pinion-rotation-angle determiner.

The target pinion rotation angle may be a value determined by execution of a travel assist program based on a traveling state of the vehicle or a value determined based on an operation state of a steering operation member by a driver, for example.

(4) The turning system according to the above form (3), wherein the electric-motor controller comprises a road-surface-reaction-force obtainer configured to obtain the road-surface reaction force to be produced in the case where the pinion gear is rotated by the target pinion rotation angle determined by the target-pinion-rotation-angle determiner, based on stiffness of the turning mechanism, tire stiffness that is a sum of stiffness of the tire on the left wheel and stiffness of the tire on the right wheel, and the target pinion rotation angle determined by the target-pinion-rotation-angle determiner.

(5) The turning system according to the above form (4), wherein the road-surface-reaction-force obtainer comprises:

a first stiffness obtainer configured to obtain the stiffness of the turning mechanism based on an axial force that is a force applied to the turning shaft in the axial direction; and a second stiffness obtainer configured to obtain the stiffness of the tire based on lateral-acceleration stiffness applied to the vehicle.

(6) The turning system according to any one of the above forms (3) through (5), wherein the electric-motor controller is configured to make a contributing portion of the frictional force in the turning mechanism which contributes to the angle of twist of the torsion bar, smaller when a change of the target pinion rotation angle determined by the target-pinion-rotation-angle determiner is small than when the change of the target pinion rotation angle determined by the target-pinion-rotation-angle determiner is large.

(7) The turning system according to the above form (6), wherein the electric-motor controller comprises:
a twist-angle-contributing-portion calculator configured to obtain the contributing portion based on a value obtained by multiplying the frictional force by a position-related value that is a value relating to a position of the rack bar; and
a position-related-value obtainer configured to determine the position-related value to a value that is obtained by integrating changes of the target pinion rotation angle and that is limited to a value greater than or equal to −1 and less than or equal to 1.

(8) The turning system according to the above form (6) or (7), wherein the electric-motor controller is configured to reduce the contributing portion when a state in which an absolute value of an amount of the change of the target pinion rotation angle determined by the target-pinion-rotation-angle determiner is less than or equal to a set value has continued for a length of time that is greater than or equal to a set length of time.

In the case where an angle keeping state, i.e., a state in which the target pinion rotation angle is substantially constant has continued for a length of time that is greater than or equal to the set length of time, the contributing portion of the frictional force may be set to zero or gradually decreased.

(9) The turning system according to any one of the above forms (3) through (8), wherein the target-motor-rotation-angle determiner is configured to determine the target motor rotation angle Xm according to the following equation:

$$Xm = Xr + (Ksat \times Xr)/[Kt \times (1+Ag)] - [\pm f/[Kt \times (1+Ag)]]$$

where Xr is the target pinion rotation angle, Ksat is the sum of stiffness of the tire on the left wheel and stiffness of the tire on the right wheel, Kt is stiffness of the turning mechanism, and f is the frictional force in the turning mechanism. "(Ksat× Xr)/[Kt×(1+Ag)]−[±f/[Kt× (1+Ag)]]" in the above-described equation corresponds to the angle of twist of the torsion bar.

(10) The turning system according to any one of the above forms (1) through (9),
wherein the turning mechanism is an automatic turning mechanism configured to turn the left wheel and the right wheel by moving the turning shaft in the axial direction without an operation of a steering operation member, and
wherein the electric-motor controller comprises an automatic turning controller configured to automatically control a turning angle of each of the left wheel and the right wheel by controlling the electric motor that is an element of the turning mechanism.

The assist mechanism 27 is one example of the automatic turning mechanism. One example of automatic turning control executed by the automatic turning controller is LTA control.

(11) A turning system configured to move a turning shaft to turn a left wheel and a right wheel, the turning shaft being configured to couple the left wheel and the right wheel to each other, a torsion bar being engaged with the turning shaft via a steering gear box, the turning system comprising:
an electric turning mechanism comprising an electric motor configured to rotate a portion of the torsion bar which is located upstream of the steering gear box; and
an electric-motor controller configured to control the electric motor based on an angle of twist of the torsion bar.

The turning system according to this form may incorporate the technical features according to any one of the above forms (1) through (10).

What is claimed is:
1. A turning system configured to move a turning shaft to turn a left wheel and a right wheel of a vehicle, the turning shaft being configured to couple the left wheel and the right wheel to each other, a torsion bar being engaged with the turning shaft via a steering gear box, the turning system comprising:
a turning mechanism comprising (i) an electric turning mechanism comprising an electric motor configured to rotate a portion of the torsion bar which is located upstream of the steering gear box and (ii) a hydraulic turning mechanism configured to apply a moving force to the turning shaft in an axial direction, the moving force being produced by a hydraulic pressure; and
an electric-motor controller configured to control the electric motor based on a frictional force in the turning mechanism and a road-surface reaction force that acts between (a) a tire on the left wheel and a tire on the right wheel and (b) a road surface,
wherein the electric-motor controller comprises a twist-angle obtainer configured to obtain an angle of twist of the torsion bar based on the frictional force in the turning mechanism and the road-surface reaction force, and the electric-motor controller is configured to control the electric motor based on the angle of twist of the torsion bar which is obtained by the twist-angle obtainer,
wherein the steering gear box comprises a rack-and-pinion mechanism,
wherein the torsion bar is coupled rotatably and integrally with a pinion gear,
wherein the pinion gear is engaged in the steering gear box with a tooth portion of a rack bar that is the turning shaft, and
wherein the electric-motor controller comprises:
a target-pinion-rotation-angle determiner configured to determine a target pinion rotation angle based on a state of the vehicle, the target pinion rotation angle being a target rotation angle of the pinion gear;
a current controller configured to control a current to be supplied to the electric motor, such that an actual rotation angle of the electric motor is brought closer to a target motor rotation angle that is a target rotation angle of the electric motor; and
a target-motor-rotation-angle determiner configured to determine the target motor rotation angle to a value obtained by adding the angle of twist of the torsion bar which is obtained by the twist-angle obtainer, to the target pinion rotation angle determined by the target-pinion-rotation-angle determiner.

2. The turning system according to claim 1, wherein the electric-motor controller comprises a road-surface-reaction-force obtainer configured to obtain the road-surface reaction force to be produced in the case where the pinion gear is rotated by the target pinion rotation angle determined by the target-pinion-rotation-angle determiner, based on stiffness of the turning mechanism, tire stiffness that is a sum of stiffness of the tire on the left wheel and stiffness of the tire on the right wheel, and the target pinion rotation angle determined by the target-pinion-rotation-angle determiner.

3. The turning system according to claim 1, wherein the electric-motor controller is configured to make a contributing portion of the frictional force in the turning mechanism which contributes to the angle of twist of the torsion bar, smaller when a change of the target pinion rotation angle determined by the target-pinion-rotation-angle determiner is small than when the change of the target pinion rotation angle determined by the target-pinion-rotation-angle determiner is large.

4. The turning system according to claim 3, wherein the electric-motor controller is configured to reduce the contributing portion when a state in which an absolute value of an amount of the change of the target pinion rotation angle determined by the target-pinion-rotation-angle determiner is less than or equal to a set value has continued for a length of time that is greater than or equal to a set length of time.

5. The turning system according to claim 1, wherein the target-motor-rotation-angle determiner is configured to determine the target motor rotation angle Xm according to the following equation:

$$Xm = Xr + (Ksat \times Xr)/[Kt \times (1+Ag)] - [\pm f/[Kt \times (1+Ag)]]$$

where Xr is the target pinion rotation angle, Ksat is tire stiffness that is a sum of stiffness of the tire on the left wheel and stiffness of the tire on the right wheel, Kt is stiffness of the turning mechanism, and f is the frictional force in the turning mechanism.

* * * * *